428-908.8 $$$ SR
PWE33 XR 4,212,691

United States Patent [19]
[11] 4,212,691
[45] Jul. 15, 1980

Potosky et al.

[54] METHODS AND APPARATUS FOR MAKING DECORATIVE INLAID TYPES OF RESILIENT SHEET MATERIALS AND THE LIKE

[75] Inventors: Milton J. Potosky, Hamilton Square; Peter J. Rohrbacher, Stockton, both of N.J.

[73] Assignee: Congoleum Corporation, Kearny, N.J.

[21] Appl. No.: 962,595

[22] Filed: Nov. 21, 1978

[51] Int. Cl.² .......................... B32B 5/20; B32B 5/16; B32B 31/20; B05C 19/00

[52] U.S. Cl. .......................... 156/79; 118/239; 156/62.2; 156/297; 156/298; 156/390; 427/180; 427/195; 427/203; 428/147

[58] Field of Search .......... 96/1 SD, 1 TE; 118/239; 156/62.2, 79, 297, 298, 390; 427/180, 189, 195, 203; 428/147

[56] References Cited

U.S. PATENT DOCUMENTS

| | | | |
|---|---|---|---|
| 3,152,002 | 10/1964 | Wisotzky et al. | 427/370 X |
| 3,232,780 | 2/1966 | Kupits | 427/197 X |
| 3,239,364 | 3/1966 | Carlisle et al. | 156/298 X |
| 3,359,352 | 12/1967 | Powell et al. | 156/77 X |
| 3,461,016 | 8/1969 | Irving et al. | 156/62.2 X |
| 3,660,187 | 5/1972 | Shortway et al. | 156/79 |

*Primary Examiner*—John T. Goolkasian
*Assistant Examiner*—Robert A. Dawson
*Attorney, Agent, or Firm*—Richard T. Laughlin

[57] ABSTRACT

A method for making decorative inlaid types of resilient sheet materials and the like comprising: depositing a substantially uniform layer of a wet, tacky, ungelled plastisol on a gelled, printed plastisol on a substrate; forming a rolling, churning bank of decorative chips or flakes over a flexible seal blade member which directs the delivery of the decorative chips or flakes from the rolling, churning bank; delivering the decorative chips or flakes from the rolling, churning bank and depositing the same on the layer of wet, tacky, ungelled plastisol, whereby, for the most part, they adhere thereto; moving the gelled, printed plastisol with its substrate and the layer of wet, tacky, ungelled plastisol and decorative chips or flakes forwardly and upwardly at an angle greater than the angle of repose for the decorative chips or flakes on the surface of the wet, tacky, ungelled plastisol, whereby some of the decorative chips or flakes slide backwardly and downwardly into the rolling, churning bank; beating or vibrating the substrate carrying the gelled, printed plastisol, whereby the excess or unadhered decorative chips or flakes slide backwardly and downwardly into the rolling, churning bank; and forwarding the gelled, printed plastisol and its substrate; the wet, tacky, ungelled plastisol thereon; and the adhered decorative chips or flakes for further processing including, for example, consolidation under pressure at elevated temperatures and other conventional processing, such as fusing, curing, blowing, foaming, etc.

22 Claims, 5 Drawing Figures

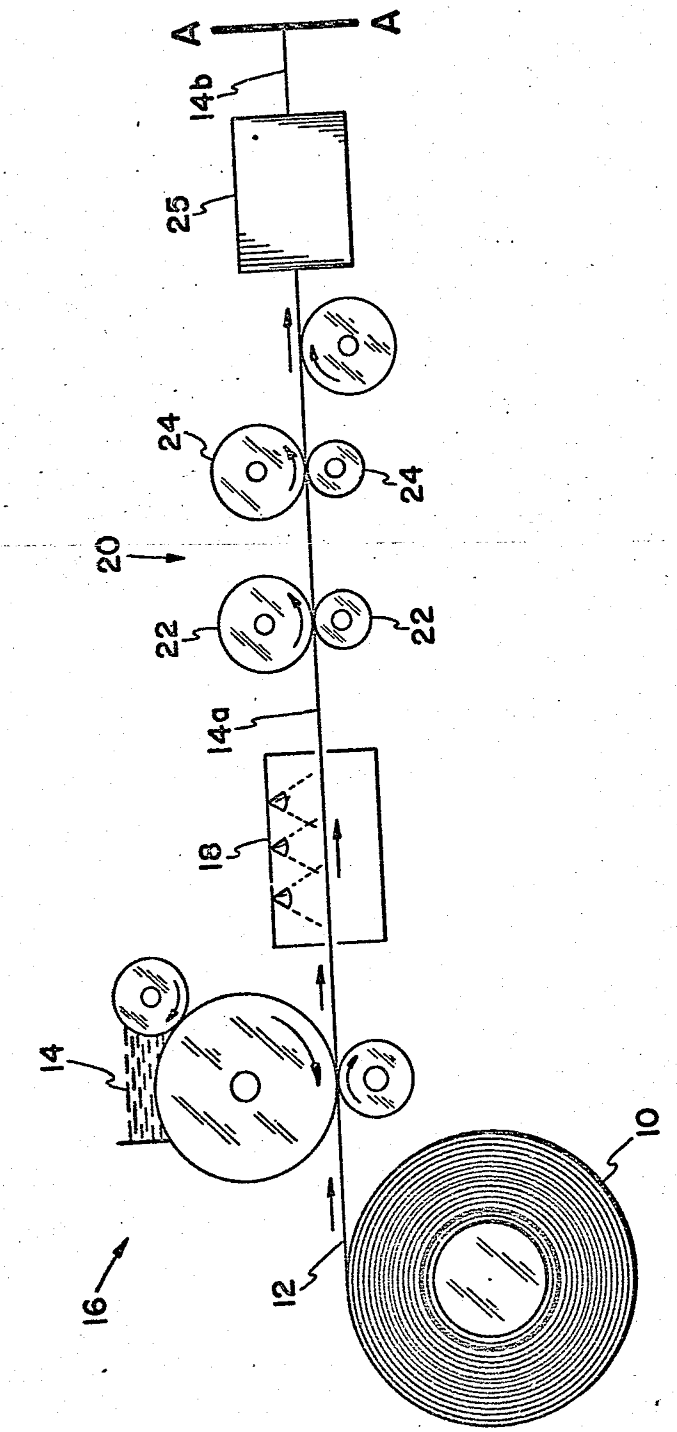
FIG. 1-A

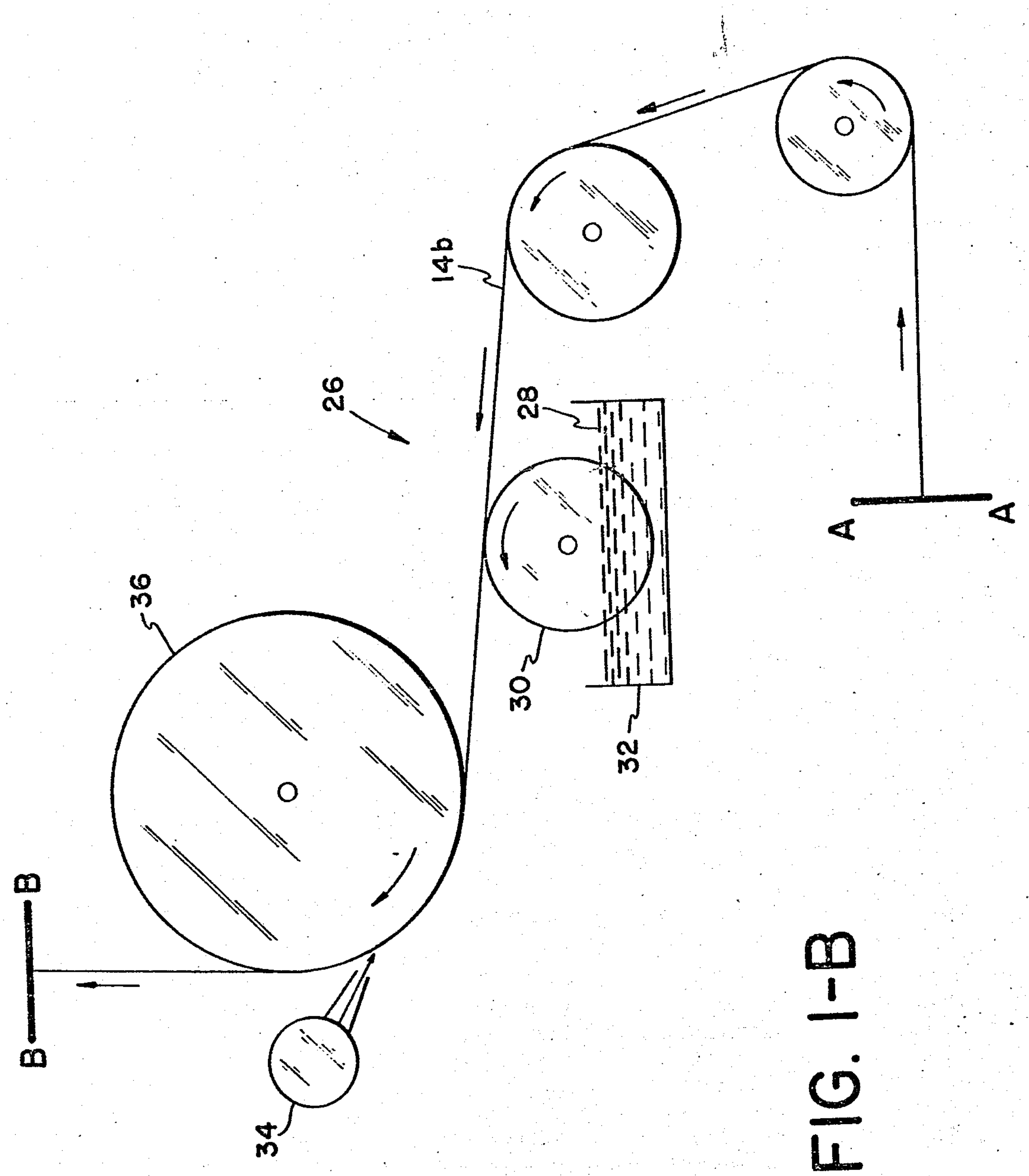
FIG. 1-B

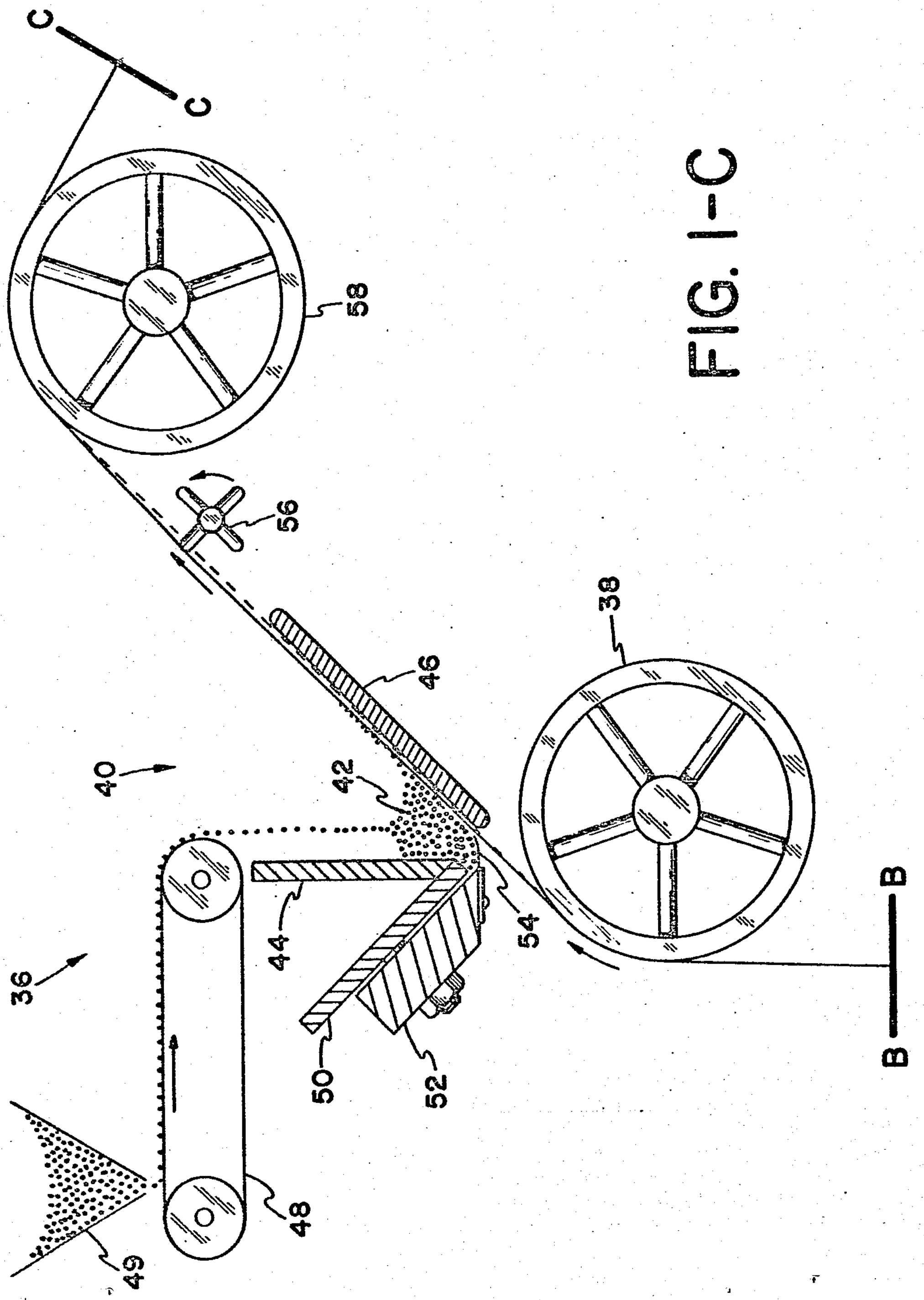
FIG. I-C

FIG. 1-D
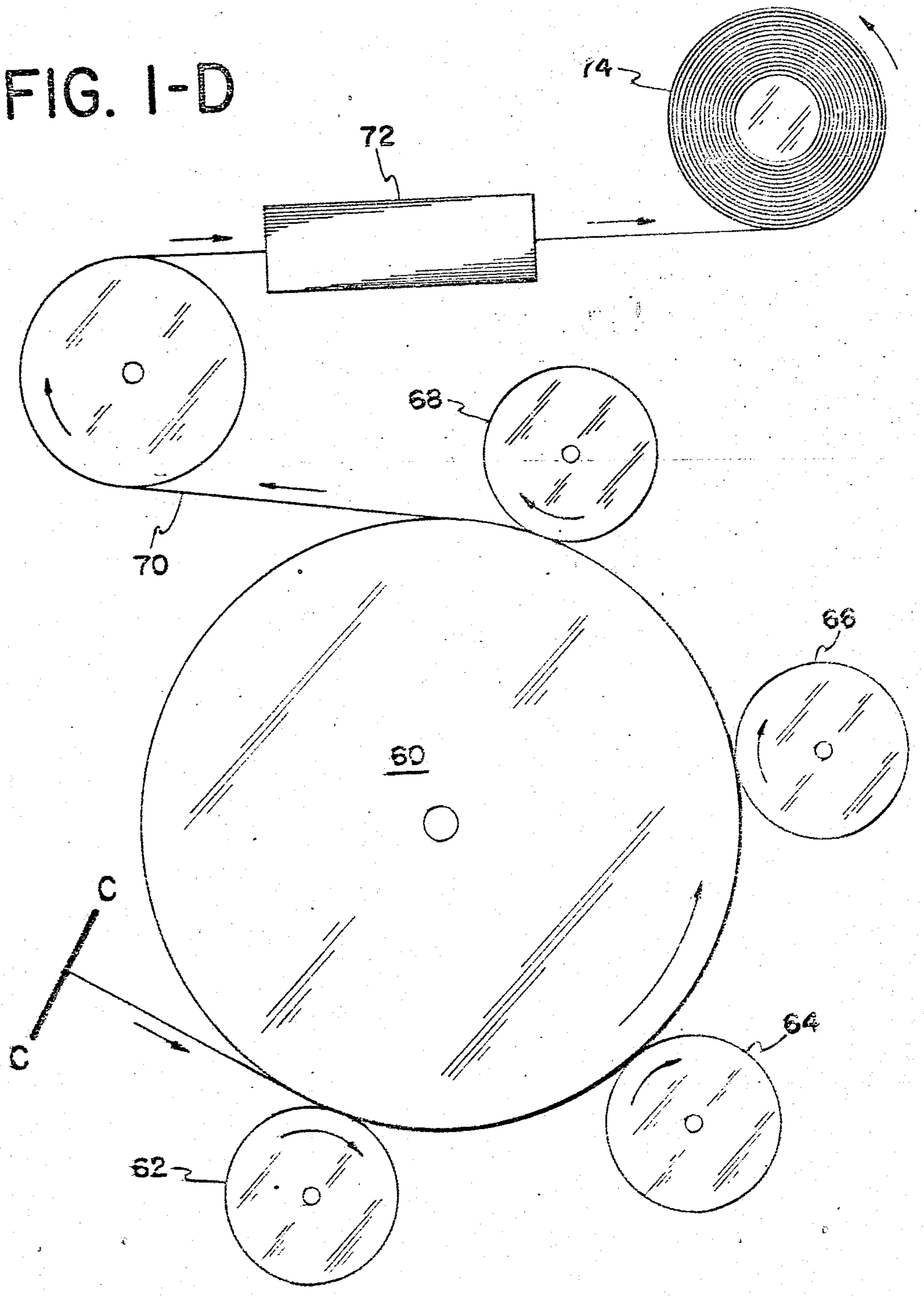

METHODS AND APPARATUS FOR MAKING DECORATIVE INLAID TYPES OF RESILIENT SHEET MATERIALS AND THE LIKE

THE FIELD OF THE PRESENT INVENTION

The present invention relates to decorative inlaid types of resilient sheet materials and the like, and more particularly is concerned with improved methods and apparatus for making such decorative inlaid types of resilient sheet materials which are useful as resilient floor, wall and ceiling coverings; table, desk and countertop surfaces; automotive interiors; and the like.

BACKGROUND AND PRIOR ART OF THE PRESENT INVENTION

In accordance with current commercial practice, resilient or flexible synthetic plastic surface coverings having a top coating or wear layer comprising one or more thermoplastic synthetic resins or polymers, one or more plasticizers, colorants or pigments in various patterns or designs, heat and light stabilizers, fillers, and other improvement agents and additives are widely used in sheet, film, or tile form for many purposes, particularly as surface coverings, primarily resilient floor coverings.

The patterns and designs and other decorative effects of such surface coverings are of prime importance in insuring the commercial acceptability of such surface coverings in the public marketplace. In recent years, there has been a great deal of interest in the creation of three-dimensional effects, or of stone terrazzo effects, and similar surface interest effects and textured appearances. Such effects and appearances are often obtained by blending opaque, translucent, or transparent, multicolored chips, flakes, or granules into the top coating or wear layer. Many processes and various forms of apparatus have been used hitherto in the manufacture of such surface coverings as noted in U.S. Pat. Nos. 3,152,002, 3.232,780, 3,239,364, 3,359,352, and 3,660,187.

However, many of these processes, although capable of producing excellent products of satisfactory commercial acceptability, have been complicated and many of the forms of apparatus used have been large, heavy, sometimes difficult to operate, and often quite expensive. One particular difficulty in prior procedures resided in the requirement or necessity of additional web monitoring equipment, such as the use of free loops, to control web back tensions. Such requirements or necessity and other objectionable features and disadvantages are avoided by the use of the apparatus and the process of the present invention.

PURPOSES AND OBJECTS OF THE PRESENT INVENTION

It is therefore a principal purpose and object of the present invention to manufacture such decorative inlaid types of sheet materials, surface coverings, and the like, by processes which are simpler and less complicated, and by apparatus which is smaller, less heavy, easier to operate, and less expensive. Other principal purposes and objects will become clear from a further reading and understanding of this disclosure.

BRIEF SUMMARY OF THE PRESENT INVENTION

It has been found that such principal purposes and objects of the present invention may be realized by: depositing a substantially uniform layer of a wet, tacky, ungelled plastisol on the surface of a gelled, optionally printed plastisol which is carried on a suitable substrate or other carrier; forming a rolling or churning bank of decorative chips or flakes over a flexible seal balde member which directs the delivery of the decorative chips or flakes from the rolling, churning bank; delivering the decorative chips or flakes from the rolling, churning bank and depositing the same on the layer of wet, tacky, ungelled plastisol whereby, for the most part, they adhere thereto; moving the gelled plastisol with its substrate and the layer of wet, tacky ungelled plastisol and decorative chips or flakes forwardly and upwardly at an angle greater than the angle of repose for the decorative chips or flakes on the surface of the wet, tacky, ungelled plastisol; and beating or vibrating the substrate carrying the gelled plastisol, whereby the excess or unadhered decorative chips or flakes slide backwardly and downwardly into the rolling, churning bank; and forwarding the gelled plastisol and its substrate, the wet, tacky, ungelled plastisol thereon, and the decorative chips or flakes adhered thereto for further processing and handling, including consolidation under pressure at elevated temperatures whereby the wet, tacky, ungelled plastisol and the decorative chips or flakes are compressed into a single layer and the ungelled plastisol transformed into a gelled plastisol with a firm surface and the resinous components thereof fused, if so desired, and other conventional finishing such as fusing, if not already achieved, and blowing or foaming, etc.

BRIEF DESCRIPTION OF THE DRAWINGS

In the following specification and accompanying self-explanatory drawings, there are described and illustrated preferred and typical embodiments of the present invention but it is to be appreciated that the broader aspects and features of the present invention are not to be construed as limited or restricted to such preferred and typical embodiments as are specifically described and illustrated herein, but to include various other similar and equivalent embodiments, as are determined by the scope and the spirir of the appended claims.

Referring to the accompanying self-explanatory drawings,

FIGS. 1A, 1B, 1C and 1D are diagrammatic, schematic, drawings of one embodiment of the present invention, illustrating a preferred and typical process and apparatus.

Figure 2:
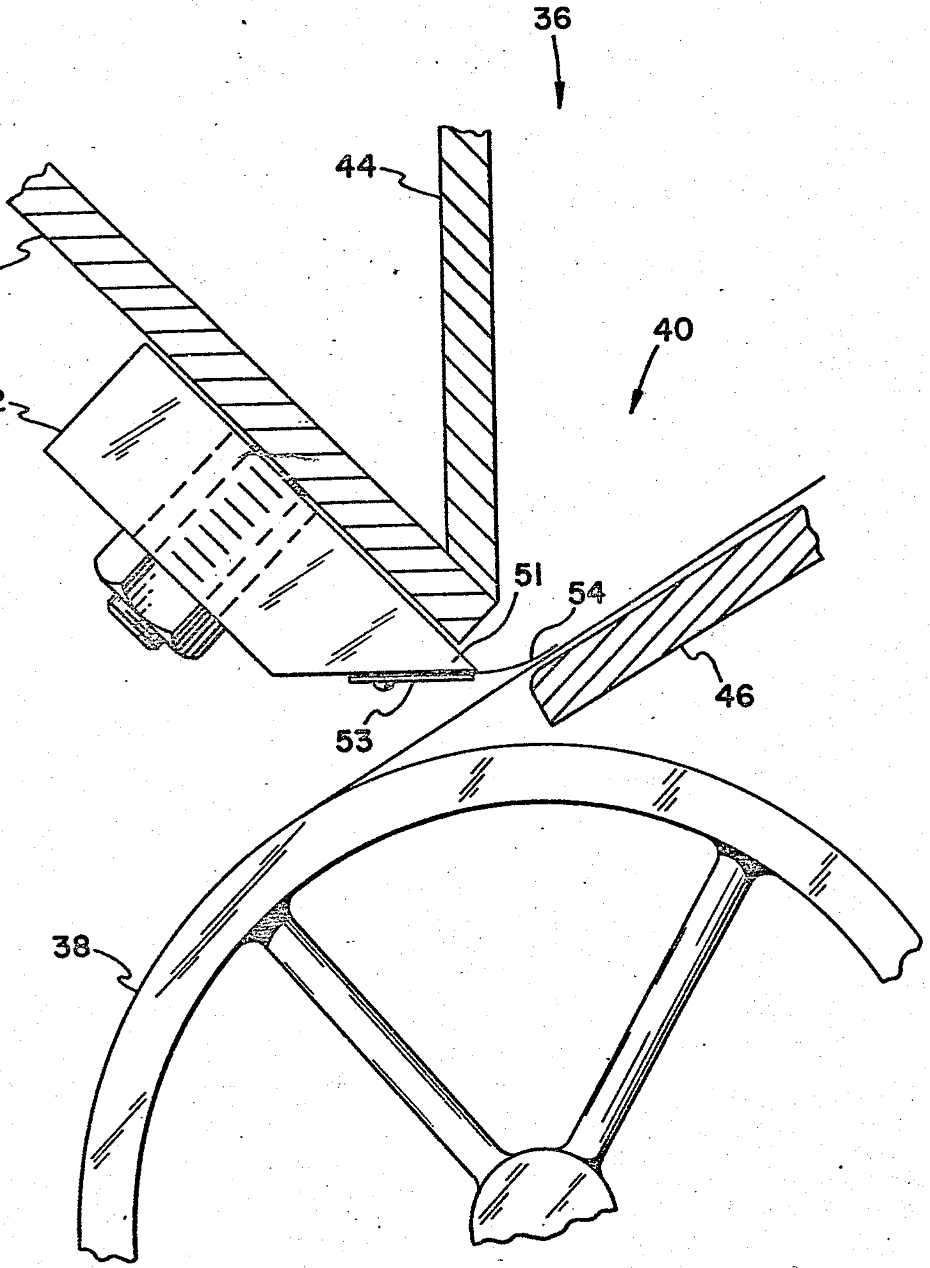
FIG. 2 is a fragmentary, diagrammatic, schematic drawing of a portion of the typical and preferred process and apparatus of FIG. 1, but drawn to a larger scale to more clearly illustrate certain portions thereof.

These Figures have not been drawn precisely or accurately to scale. Some portions and some dimensions have been drawn to a larger scale, whereas certain other portions and certain other dimensions have been drawn to a smaller scale. This has been done primarily merely to bring out more clearly some of the finer details of the smaller portions and elements and to accentuate some of the details of the more important portions. It is believed that such will lead to a more facile and clearer understanding of the principles of the present invention.

GENERAL DESCRIPTION OF THE PRESENT INVENTION

THE SUBSTRATE

With specific reference to FIG. 1A of the drawings, there is shown therein a rotatable supply roll 10 from which is delivered a relatively flat, fibrous or non-fibrous backing sheet material or substrate 12, such as a fibrous, felted or matted relatively flat sheet of overlapping, intersecting fibers, usually asbestos or of cellulosic origin. The substrate 12 may, if desired, be a woven, nonwoven, knitted or otherwise fabricated textile material, paper stock, a sheet or film of a synthetic or man-made plastic, or any of the materials mentioned in the previously mentioned United States Patents.

THE BASE RESINOUS POLYMER COMPOSITION OR PLASTISOL

A base resinous polymer composition 14, preferably and typically a polyvinyl chloride plastisol, is substantially uniformly applied to the surface of the substrate 12 at a coating station 16, such as, for example, by means of a reverse roll coater.

The thickness of the base resinous polymer composition or plastisol 14, as it is applied to the surface of the substrate 12 and is still wet, is substantially uniform and is in the range of from about 0.005 inch to about 0.060 inch, or even thicker, if so desired or required by future requirements or needs.

The particular means for applying the base resinous polymer composition 14 to the surface of the substrate 12 does not relate to the essence of the present invention and substantially any suitable coating means may be employed.

Also, although the preferred and typical synthetic resin is a polyvinyl chloride homopolymer, many other vinyl resins are of use, such as a vinyl chloride-vinyl acetate copolymer, a vinyl chloride-vinylidene chloride copolymer, and copolymers of vinyl chloride with other vinyl esters such as vinyl butyrate, vinyl propionate, or even alkyl substituted vinyl esters. Other suitable synthetic or man-made resins such as polystyrene and substituted polystyrene; polyolefins such as polyethylene and polypropylene; acrylates and methacrylates; polyamides; polyesters; etc., are also applicable within the principles of the present invention. And, it is not essential that a plastisol always be used. Organosols and aqueous latices (aquasols and hydrasols) are also of use, employing as the dispersing or suspending media, not plasticizers, as in the case of a plastisol, but organic solvents and water, respectively.

In the case of the preferred and typical species of a plastisol, a few suitable plasticizers include: dibutyl sebacate, dioctyl sebacate, butyl benzyl sebacate, dibenzyl sebacate, dioctyl adipate, didecyl adipate, dibutyl phthalate, dicapryl phthalate, dioctyl phthalate, dibutoxy ethyl phthalate, butyl benzyl phthalate, dibenzyl phthalate, di(2-ethylhexyl) phthalate, alkyl aryl modified phthalate esters, alkyl aryl hydrocarbons, tricresyl phosphate, octyl diphenyl phosphate, dipropylene glycol dibenzoate, dibasic acid glycol esters, etc.

Other constituents of the base resinous polymer composition 14 may include: a blowing or foaming agent, such as azodicarbonamide, if a blowing or foaming procedure is desired; various accelerator/stabilizers, initiators, catalysts, etc., such as zinc octoate, dibasic lead phosphite, etc.; various heat and/or light stabilizers, such as metallic soaps, etc.; UV absorbers; colorants, dyes and pigments, notably titanium dioxide; solvents and diluents such as methyl ethyl ketone, methyl isobutyl ketone, dodecyl benzene, etc., fillers such as clay, limestone, etc.; viscosity modifiers; antioxidants; bacteriostats and bacteriocides; etc.

THE GELLING OPERATION

After the base resinous polymer composition 14 has been applied and adhered to the substrate 12, it is then heated in an oven or other suitable heating apparatus 18 maintained at an elevated temperature of from about 240° F. to about 450° F., and preferably from about 260° F. to about 410° F. for a period of time of from about 1 minute to about 5 minutes, whereby it gels and becomes firm. The temperature and the time are interdependent and the higher the temperature, the shorter the time, and vice versa. The elevated temperature, however, is not that high as to activate or to decompose any blowing or foaming agent which may have included in the formulation of the base resinous polymer composition 14 as to cause blowing or foaming at this time.

THE PRINTING OF THE GELLED BASE RESINOUS POLYMER COMPOSITION

The gelled or firmed base resinous polymer composition 14A may then be printed or coated, if so desired, at a printing station 20 by means of two or more pairs of suitably engraved printing rolls 22 and 24 with printing ink compositions containing dyes, colorants, pigments, etc., if a design or pattern is desired or required in the final product. The printing ink composition may also contain synthetic resins, plasticizers, stabilizers, antioxidants, blowing or foaming modifying agents in selected areas, if an embossed or textured surface appearance is desired or required; etc. Drying of the applied printing ink composition is accomplished by air drying, or by the use of conventional heating and drying procedures.

THE BARRIER COAT

In some cases, it has been found that the blowing or foaming action of the potentially foamable base resinous polymer composition 14 may be of such a strong or vigorous nature that the gases which are developed or released by the blowing or foaming agent tend to escape upwardly from the heated base resinous polymer composition and tend to enter any wear layer or any other layer lying above it to undesirably affect the smoothness and evenness of the wear layer surface. Such could be ruinous to the smoothness and evenness of surfaces, if such characteristics are desired and could be undesirable from an esthetic viewpoint.

Such undesirable effect may be avoided by placing a relatively thin barrier coat or layer having a thinness of only about 6 mils or less, down to about 1 or 2 mils, on top of the base resinous polymer composition 14, either before or after any printed pattern or design is applied thereto, but necessarily before any further coatings or layers are applied. Such a barrier coat or film effectively prevents the gases from going upwardly from the blowing or foaming base resinous polymer composition.

Such a barrier coat is applicable as a film but is normally applied as a plastisol or resinous polymer composition in a thin layer of a resin, such as a vinyl chloride polymer or copolymer, having a relatively high molecular weight. Gelling of such a barrier coat naturally follows at an elevated temperature below the activation or decomposition temperature of the blowing or foaming agent. A typical barrier coating station 25 is generally indicated in FIG. 1A of the drawings.

Two preferred and typical barrier coat formulations are as follows:

| | Parts | Parts |
|---|---|---|
| Polyvinyl chloride, high mol. wt., dispersion grade, inherent viscosity 1.4 | 89 | 90 |
| Polyvinyl chloride, high mol. wt., blending resin, inherent viscosity 0.9 | 11 | 10 |
| Dioctyl phthalate | | 6 |
| Epoxidized soya oil | 5 | 5 |
| 2,2,4-trimethyl-1,3-pentanediol diisobutyrate | 6.9 | 8.8 |
| Butyl benzyl phthalate | 29 | 19.6 |
| Polydodecyl benzene | 8.5 | 5.5 |
| Ba-Zn phosphite stabilizer | 7.25 | 3 |
| UV absorber | 0.32 | 0.32 |
| Toner | 0.01 | 0.01 |

(Parts by weight, based on 100 parts of resin, phr)

THE APPLICATION OF THE WET, TACKY, UNGELLED PLASTISOL

As shown in FIG. 1B of the drawings, the gelled resinous polymer composition 14*b* is then advanced to a coating station 26 whereat a wet, tacky, ungelled plastisol resinous polymer composition 28 is substantially uniformly applied to its surface, such as, for example, by a suitable coating applicator roll 30 dipping into a conventional coating par 32. The wet, tacky, ungelled plastisol 28 may have the same chemical formulation and properties and characteristics as that of the base resinous polymer composition 14, or it may have a different formulation and different properties and characteristics and may include any one or more of the previously mentioned synthetic resins.

The thickness of the layer of wet, tacky, ungelled plastisol 28, as it is applied to the surface of the base resinous polymer composition 14*b* and is still wet is substantially uniform and is in the range of from about 4 mils to about 20 mils, or even more but preferably is in the range of from about 5 mils to about 9 mils. The thickness of the coating of the layer of wet, tacky, ungelled plastisol 28 may be controlled by an air knife doctor device 34 and a backing roll 36. The particular means for applying and controlling the thickness of the layer of wet, tacky, ungelled plastisol 28 does not relate to the essence of the present invention and substantially any suitable coating device may be employed, provided it is capable of accurately applying and controlling the thickness of the coating.

The layer of wet, tacky, ungelled plastisol resinous polymer composition 28 is, of course, ungelled and uncured and unfused and has a viscosity in the range of from about 500 centipoises (Brookfield) up to as high as 50,000 centipoises (Brookfield), (Brookfield, No. 3 spindle, 20 r.p.m., room temperature) provided the plastisol retains its wet, tacky properties and characteristics. A viscosity range of from about 1000 to about 1300 centipoises has been found to be most desirable under normal commercial manufacturing conditions.

As will be seen subsequently, the thickness of the layer of wet, tacky, ungelled plastisol 28 and its viscosity are among the key factors which will determine the metering and the control of the amount and the thickness of the layer of decorative chips or flakes which are deposited and adhered thereon.

THE APPLICATION OF THE DECORATIVE CHIPS OR FLAKES

As shown in FIG. 1C of the drawings, the gelled resinous polymer composition 14*b* and the layer of ungelled resinous polymer composition 28 thereon are then forwarded to a decorative chip or flake coating device 36, which is shown in greater detail in FIG. 2, whereat it passes over a rotatable index roll 38 and then under a supply hopper 40 containing chips, flakes or granules 42 which are to be substantially uniformly deposited on the surface of the layer of wet, tacky, ungelled plastisol 28 and adhered and embedded therein subsequently.

The supply hopper 40 comprises a fixed, substantially vertical wall 44 and an adjustable, angularly inclined wall or bed plate 46 between which the decorative chips or flakes 42 are contained in the form of a supply bank which is kept at a substantially constant level by being fed by a continuously movable, endless supply conveyor belt 48 and a reserve hopper 49. The angularly inclined bed plate 46 is adjustable rotatably whereby its angularity with respect to the horizontal plane may be set at any desired value and laterally whereby its spacing from the vertical wall 44 may be changed.

An angularly inclined, fixed plate 50 is secured to the substantially vertical wall 44 and has adjustably secured thereon a clamping arm or holder 52 for a flexible seal blade member 54. As best shown in FIG. 2, the holder 52 comprises an extending end portion 51 and a fastening or clamping plate member 53 for adjustably holding the flexible seal blade member 54 which is shown as curved or arcuate, but which may also be straight. The flexible seal blade member 54 forms the lowermost portion or floor for the supply bank of chips or flakes 42 in the supply hopper 40. The exposed end of the flexible seal blade member 54 extends toward the bed plate 46 and is so adjustably mounted that it permits the wet, tacky, ungelled plastisol 28 to pass thereunder but prevents any chips or flakes from slipping thereunder backwardly and downwardly during the actual operation of the apparatus and the concomitant forward motion of the chips or flakes on the wet, tacky, ungelled surface.

The right hand end of the seal member 54 (as viewed in FIG. 2) may therefore rest lightly on the moving surface of the layer of wet, tacky, ungelled plastisol 28 without exerting any undue force or pressure thereon and substantially without creating any permanent deformation therein or any disturbance thereof.

If desired, the exposed end of the flexible seal blade 54 may be so adjustably positioned that it does not actually touch the surface of the layer of wet, tacky, ungelled plastisol 28 but is spaced therefrom by a small distance, thus providing a narrow gap which is such that the decorative chips or flakes 42 in the supply bank cannot pass under the flexible seal blade 52 during operation of the apparatus to slide backwardly and downwardly. Such narrow gap is in the range of from about 0.001 inch to about 0.125 inch.

As will be seen hereinafter, such narrow gap may be smaller or larger than the particle size of the largest decorative chips or flakes 42 which are used. However, the advancing forward motion of the layer of wet, tacky, ungelled plastisol 28 is sufficient, along with the upward angularity of such advancing forward motion, and other process factors, to keep the supply bed of decorative chips or flakes 42 churning and rolling about in a configuration having a counterclockwise direction, as viewed in FIG. 2, whereby such decorative chips or flakes 42 do not slide backwardly and downwardly to slip under the exposed end of the flexible seal blade member 54.

The exposed length of the flexible seal blade 54, that is, the length which extends outwardly from the grip of the extending end portion 51 of the holder 52 and the fastening or clamping plate member 53 is in the range of from about ½ inch to about 3 inches, and preferably from about 1 inch to about 1½ inches.

The total length (widthwise direction) of the flexible seal blade is such as to cover the complete width of the plastisol being processed, plus an additional inch or two beyond. For example, if a 72 inch product is intended, then the total width of the flexible seal blade member 54 is in the range of from about 74 to about 78 inches.

THE DECORATIVE CHIPS OR FLAKES

The decorative chips, flakes or granules 42 used in the application of the principles of the present invention are prepared from resinous polymer compositions comprising synthetic resins, plasticizers, fillers, light and heat stabilizers, required dyes, colorants and pigments, and any other conventional desired or required constituents. One typical and preferred formulation for a decorative chip or flake stock material is as follows:

| | Parts |
|---|---|
| Polyvinyl chloride | 100 |
| Platy talc filler | 50 |
| Dioctyl phthalate | 32.5 |
| Butyl benzyl phthalate | 4.5 |
| Stabilizer | 7.5 |
| UV light absorber | 0.4 |
| Pigment | 6.0 |

The various constituents of the selected flake formulation are formed into sheets of the desired thickness by any suitable means, such as by passage through calender rolls, or by extrusion processes, and the resulting sheets so produced are converted by cutting into the desired geometric shapes, such as squares, triangles, circles, annuli, other polygons, etc., or irregular sizes and shapes, or mixtures of any or all of such shapes. If a multiplicity of colors and hues are desired, then a multiplicity of separate sheets are so prepared, each with its own individual colorant, dye, or pigment, and then these sheets are individually cut into the desired sizes and shapes and then intermixed in the desired or required proportions in order to obtain the multicolored effects. Sheets of different thicknesses may be used.

The thickness of the various sheets of material from which the decorative chips or flakes are made depends primarily upon the desired pattern or design and upon the thickness of the layer of wet, tacky, ungelled plastisol 28 or other material into which they are to be ultimately embedded. Under normal circumstances, sheet thicknesses of from about ¾ to about 2x, and preferably from about ½ to about 1½x the thickness of the wet, tacky, ungelled plastisol 28 or other material are used. Such a thickness range is normally from about 3 mils to about 25 mils, and preferably from about 10 mils to about 15 mils. Naturally, various thicknesses of these geometric decorative chips or flakes may be intermixed.

The thickness of the layer of decorative chips or flakes, as initially applied to the surface of the wet, tacky, ungelled plastisol varies widely but normally is in the range of from about 3 mils to about 30 mils, or even more, as desired or required by circumstances and conditions.

The decorative chips or flakes need not necessarily be all plastic. A particularly desirable effect is obtained by using small pieces, chips or flakes of a metal foil, such as made of aluminum, which have been coated with a pigmented vinyl coating composition, similar to those disclosed hereinbefore. These materials are sheeted, as described previously, and converted into the geometric shapes, as desired. The metal foil can be extremely thin and can range down as low as about 2 mils, or even down to 0.6 mil. The metal foil can even be embossed to give it an additional luster. The longest or the largest dimension of these decorative chips or flakes may range up to as much as about 50 mils or 100 mils, or even to 500 mils in some circumstances.

As the layer of wet, tacky, ungelled plastisol 28 passes forwardly underneath the flexible seal blade member 54, a portion of the supply bank of decorative chips or flakes 42 is deposited substantially uniformly thereon and is adhered thereto. Substantially simultaneously or immediately thereafter, the substrate carrier 12 carrying the gelled resinous polymer composition 14*b* and the layer of wet, tacky, ungelled plastisol resinous polymer composition 28 thereon come into sliding contact with the angularly inclined bed plate 46 and is guided forwardly and upwardly in positive fashion thereby.

The angularly inclined bed plate 46 has a relatively flat and smooth surface and is so angularly positioned that its surface is at an angle to the horizontal plane greater than the angle of repose of the decorative chips or flakes, as they rest on the surface of the wet, tacky, ungelled plastisol 28. As a result of such angularity of the bed plate 46, many of the decorative chips or flakes 42 which are only partially or insufficiently or too loosely adhered to the surface of the layer of wet, tacky, ungelled plastisol 28 are released therefrom to slide backwardly and downwardly to return to the supply bank of decorative chips or flakes at the vertex of the substantially vertical wall 44 and the angularly inclined bed plate 46, thus creating a rolling or churning effect therein which continuously keep turning over.

The angle of repose for the decorative chips or flakes 42 on the surface of the layer of wet, tacky, ungelled plastisol 28 varies according to many factors, for example, the state of the tackiness and the adhesivity of the surface of the layer of wet, tacky, ungelled plastisol 28; the viscosity thereof; the sizes shapes and properties and characteristics of the decorative chips or flakes 42; the existing temperature and humidity conditions of operation; etc., but such angle of repose has been established to be normally about 30° to the horizontal. Too steep an angularity for the bed plate 46 is not desirable inasmuch as such increases the difficulty of satisfactorily initially adhering the decorative chips or the flakes 42 to the surface of the layer of wet, tacky, ungelled plastisol 28. However, an angle range of from about 30° to about 60° has been found satisfactory and is normally used.

The angle of repose is determined by permitting the decorative chips or flakes to exit from a supply hopper having a small circular opening in its floor to form a cone-shaped pile or mound on a horizontal surface therebeneath. The angle to the horizontal formed by the slanting sides of the cone-shaped pile or mound is the angle of repose.

THE BACK BEATER

A rotating back beater 56 which is provided with radially extending spokes or vanes is supplied just beyond the upper end of the angularly inclined bed plate 46 and intermittantly strikes the back surface of the carrier substrate 12 whereby it is shaken or vibrated so that any partially, insufficiently or loosely adhered decorative chips or flakes 42 which have not previously slid or fallen backwardly and downwardly into the supply bank are given an additional chance to be released to slide back into the supply bank, whereby only well adhered decorative chips and flakes remain on the surface of the layer of wet, tacky, ungelled plastisol 28.

The extent or the intensity of the beating or the vibrating of the wet, tacky, ungelled plastisol 28 may be varied by increasing or decreasing the rotational speed of the back beater 56, or by moving the rotating back beater 56 closer or farther from the substrate 12, whereby the beating or vibrating force is greater or less or has a greater or less frequency.

It is again to be observed that the angle of the bed plate 46, in conjunction with the operation of the rotating back beater 56, are key factors in determining the metering and the monitoring of the amount and the thickness of the layer of chip or flake material which remains adhered to the surface of the layer of wet, tacky, ungelled plastisol 28.

The substrate 12 carrying the gelled base resinous polymer composition 14*b* and the layer of wet, tacky, ungelled plastisol resinous polymer composition 28 thereon with the adhered decorative chip or flake materials thereon then passes onward and upwardly over a rotatable guide roll 58 to be forwarded for further processing and finishing, as desired or required.

FURTHER PROCESSING AND FINISHING

Such further processing and finishing operations may take many different forms and may involve many different forms of apparatus. One such further processing procedure is illustrated in FIG. 1D, wherein there is shown a consolidation procedure employing a large steam-heated (or superheated steam-heated) rotatable cylindrical drum which is capable of being heated to elevated temperatures of about 400° F., or even higher, for the consolidation procedure. Located around the cylindrical surface of the heated drum are a plurality of heated, rotatable pressure-applying cylindrical press-rolls 62, 64, 66, and 68 which are capable of applying pressure to any materials placed on the cylindrical surface of the heated cylindrical drum 60. Pressures of up to 180 pounds (gauge) per lineal inch of contact between the heated cylindrical drum 60 and the individual pressure rolls 62, 64, 66 and 68 are normally employed in the consolidation procedure. A greater or a lesser number of pressure rolls may be used, as well as greater or lesser pressures applied thereby.

As one of the results of the consolidation procedure employing such elevated temperatures and applying such pressures, a consolidated resinous polymer sheet material 70 is obtained, wherein the decorative chips or flakes 42 are embedded into wet, tacky ungelled plastisol 28 and form a compact layer having a relatively firm, smooth surface tightly bonded to the base layer resinous polymer composition 14 situated on the underlying carrier substrate 12.

Additionally, the elevated temperatures and the applied pressures are sufficient to gel and to firm the wet, tacky plastisol and, if desired, to also fuse the resinous components in the various layers of the materials being treated. However, the temperatures are not that elevated normally as to decompose or to activate any blowing or foaming agent which may have been included in the original base resinous polymer composition 14.

The consolidated, gelled and firmed resinous product 70 may then be advanced to pass through a fusion oven 72, wherein fusion, if not carried out previously, and blowing or foaming may take place. Fusion is normally obtained by exposure for a period of time of from about 1 minute to about 6 minutes to elevated temperatures in the range of from about 325° F. to about 470° F. but more normally at least about 385° F. depending upon the nature of the particular polymeric materials which are bring used. Such elevated temperatures are also normally sufficient to bring about blowing and foaming in the base resinous polymer composition, if a blowing or foaming agent was originally included in the base formulation. Blowing or foaming may take place in any and all areas wherein the effect of the blowing or foaming agent has not been inhibited by the inclusion of an inhibitor in certain areas of the selected portions of the desired printed pattern or design applied by the printing ink compositions.

The final product is then advanced to a rotatable wind-up roll 74 for disposition or for further processing and handling, as desired or required.

The present invention will be further described with particular reference to the following specific working examples, in which there are shown and illustrated preferred and typical embodiments of the present invention. However, it is to be appreciated that such specific working examples are primarily illustrative of the general principles of the present invention and that the specific materials, chemicals, patterns, designs, and other particular aspects set forth therein should not be construed as limitative of the broader aspects of the present inventive concept, except as defined by the spirit and the scope of the appended claims.

EXAMPLE I

The apparatus schematically and diagrammatically illustrated in FIGS. 1 and 2 is used to carry out the following process:

The fibrous backing sheet material or substrate comprises a relatively flat, 0.040 inch thick fibrous sheet of felted and matted asbestos fibers provided with an acrylic smooth leveling coating thereon.

The base resinous polymer composition which is applied to the substrate to a substantially uniform wet thickness of about 0.015 inch is a polyvinyl chloride plastisol having the following formulation:

| | Parts by Weight |
|---|---|
| Polyvinyl chloride, med. mol. wt., general purpose dispersion resin, inherent viscosity 0.99 (ASTM D1243-66) | 30.2 |
| Polyvinyl chloride, med. mol. wt., dispersion grade resin, inherent viscosity 1.0 | 8.2 |
| Polyvinyl chloride, med. mol. wt., blending resin, inherent viscosity 0.9 | 17.1 |
| Anhydrous alumina silicate filler | 6.9 |
| Butyl benzyl phthalate | 15.4 |
| Alkyl benzyl phthalate, low b.p. plasticizer | 9.3 |
| Polydodecyl benzene | 7.4 |
| Azodicarbonamide | 1.1 |

-continued

| | Parts by Weight |
|---|---|
| Accelerator/stabilizer | 0.4 |
| Titanium dioxide | 2.5 |
| Dioctyl phthalate | 1.5 |
| Wetting agent | 0.3 |

Gelling and firming of the potentially foamable base resinous polymer composition (polyvinyl chloride plastisol) takes place in a heated oven at an elevated temperature of about 300° F. for a period of time of about three minutes. Such temperature is not sufficiently high as to activate or decompose the azodicarbonamide blowing or foaming agent as to cause blowing or foaming.

The gelled, firmed polyvinyl chloride plastisol is then printed with a pattern or design in which some areas are printed with a printing ink composition containing a blowing or foaming inhibitor and in which other areas are printed with a printing ink composition not containing a blowing or foaming inhibitor. The inhibitor acts on the blowing agent either directly or indirectly to raise or lower the temperature at which the blowing agent decomposes resulting in either depressed or raised effects in those areas where the inhibitor was applied. The printing ink compositions are allowed to air-dry.

A barrier coat layer is then applied to a thickness of about 3 mils on the surface of the printed, gelled and firmed polyvinyl chloride plastisol. The barrier coat layer has the following formulation:

| | Pounds |
|---|---|
| Polyvinyl chloride, low-med. mol. wt., fine particle size, suspension resin | 40 |
| Polyvinyl chloride, med.-high mol wet. dispersion resin | 60 |
| Diisodecyl phthalate | 45 |
| Stabilizer | 4 |
| Epoxidized soya oil | 4 |
| UV absorber | 0.3 |
| Toner | 0.2 |

The printed, gelled and firmed polyvinyl chloride plastisol having a barrier coat layer thereon is then coated with a 0.007 inch thick layer of a wet, tacky, ungelled polyvinyl chloride plastisol resinous polymer composition having a viscosity of about 1000 centipoises (Brookfield, #4 spindle, 20 r.p.m., room temperature) and the following formulation:

| | Pounds |
|---|---|
| Polyvinyl chloride, low-med. mol. wt., fine particle size, suspension resin | 40 |
| Polyvinyl chloride, low-med. mol. wt., dispersion resin | 60 |
| Diisodecyl phthalate | 45 |
| Stabilizer | 4 |
| Epoxidized soya oil | 4 |
| UV absorber | 0.3 |
| Toner | 0.2 |

The gelled polyvinyl chloride base resinous polymer composition with the layer of ungelled, wet, tacky plastisol thereon is then advanced to a chip or flake coating station, whereat there is deposited substantially uniformly thereon a layer of decorative chips or flakes having an average thickness of about 0.013 inch and having the following formulation:

| | Pounds |
|---|---|
| Polyvinyl chloride, low-med. mol. wt., suspension resin | 100 |
| Diisodecyl phthalate | 30 |
| Stabilizer | 3 |
| Toner | 0.2 |
| Pigment | 0.5 |
| Platy talc filler | 25 |

The polyvinyl chloride chip or flake materials are deposited on the surface of the wet, tacky, ungelled plastisol and the chip or flake consumption during the over-all manufacturing process is about 0.65 pounds per square yard of wet, tacky, ungelled plastisol coated. During the deposition of the chip or flake materials on the layer of wet, tacky, ungelled plastisol, the end of the arcuate or curved seal blade member rests lightly on the wet, tacky, ungelled plastisol layer but does not exert any appreciable pressure thereon and does not create any permanent deformation therein. The seal blade member does not meter the thickness of the wet, tacky, ungelled plastisol and does not meter the amount of decorative chips or flakes deposited thereon.

The flexible seal blade member is 10 mils thick, has a total width of about 77 inches, an exposed length extending beyond the gripping end of the holder of 1 inch, and is made of a synthetic plastic material, "Teflon" polytetrafluoroethylene resin.

The angularly inclined bed plate is positioned at an angle of approximately 45° above the horizontal which is an angle greater than the angle of repose for the decorative chips or flakes on the surface of the layer of wet, tacky, ungelled plastisol. As a result, any chip or flake material which is insufficiently or too loosely adhered to the layer of wet, tacky, ungelled plastisol is released therefrom and slides backwardly and downwardly to return to the rolling supply bank of decorative chip or flake material.

The back beater rotates continuously and intermittantly strikes the underside of the substrate, causing it to vibrate, whereby additional insufficiently adhered chip or flake materials are shaken loose to slide backwardly and downwardly to return to the rolling supply bank of decorative chip or flake material.

The substrate with the gelled, firmed base resinous polymer composition thereon and the wet, tacky, ungelled resinous polymer composition thereon and the adhered decorative chips or flakes is then forwarded to a consolidation procedure, such as is shown in FIG. 1D.

The main, superheated steam-heated rotating drum has a temperature of about 335° F. and the four peripheral rotatable pressure applying rolls apply pressures of 120, 140, 160 and 160 pounds (gauge) per lineal inch. The line speed is approximately 20 feet per minute. The gauge or thickness of the consolidated layer is 20 mils.

During the consolidation procedure, the decorative chips or flakes are compressed into and become embedded in the layer of wet, tacky, ungelled plastisol which gels during the procedure and becomes relatively firm. The surface of the gelled plastisol is no longer tacky or wet and is relatively smooth. No blowing or foaming take place at the temperatures used in the consolidation procedure.

The gelled product is then advanced to a fusion oven whereat fusion and blowing or foaming take place at an elevated temperature of about 395° F. for a period of time of about 3 minutes. Blowing and foaming take place only in those areas where no blowing or foaming inhibitor was placed. There is substantially no blowing or foaming in those areas where a blowing or foaming inhibitor was placed. The chemical embossing effect is excellent. The final product is useful as a 6-foot wide resilient floor covering.

EXAMPLE II

The procedures described in Example I are followed substantially as set forth therein with the exception that the exposed end of the arcuate seal blade member is positioned away from the surface of the layer of wet, tacky, ungelled plastisol to form a gap of 0.030 inch. The relative forward motion of the layer of decorative chips or flakes, however, is such that a rolling, churning supply bank of decorative chips or flakes is formed in the vertex of the supply hopper without any decorative chips or flakes falling backwardly or downwardly underneath the exposed end of the seal blade member during continued operation of the apparatus, even though the particle size of the decorative chips or flakes is less than the size of the slit-like opening or gap. The operation on the whole is generally similar to that described in Example I and the results are comparable.

EXAMPLE III

The procedures described in Example I are followed substantially as set forth therein with the exception that the length of the exposed end of the flexible seal blade member extending beyond the gripping end of the holder is increased from 1 inch to 1½ inches but still rests lightly on the surface of the wet, tacky, ungelled plastisol layer without exerting any appreciable pressure thereon or creating any permanent deformation therein. The operation on the whole is generally similar to that described in Example I and the results are comparable.

EXAMPLE IV

The procedures described in Example I are followed substantially as set forth therein with the exception that the flexible seal blade member is made of steel, is 8 mils thick, an exposed length of about 1 inch, and with the outer extremity spaced from the surface of the layer of wet, tacky, ungelled plastisol by a gap of 30 mils. The results of this Example are generally comparable to the results obtained in Example I.

EXAMPLE V

The procedures described in Example I are followed substantially as set forth therein with the exception that the flexible seal blade member is not arcuate or curved but is straight and is so positioned that its outer exposed end still rests lightly on the surface of the layer of wet, tacky, ungelled plastisol without exerting any appreciable pressure thereon and without creating any permanent deformation therein. The results of this Example are generally comparable to the results obtained in Example I.

EXAMPLE VI

The procedures described in Example V are followed substantially as set forth therein with the exception that the length of the exposed end of the straight flexible seal blade member is decreased from 1 inch to ½ inch. The results of this Example are generally comparable to the results obtained in Example I.

EXAMPLE VII

The procedures described in Example I are followed substantially as set forth therein with the exception that the line speed is increased from 20 feet per minute to 32 feet per minute. The results of this Example are generally comparable to the results obtained in Example I, except for increased productivity.

EXAMPLE VIII

The procedures described in Example I are followed substantially as set forth therein with the exception that the angular inclination of the bed plate is increased from 45° to 55°. The results of this Example are generally comparable to the results obtained in Example I.

EXAMPLE IX

The procedures described in Example I are followed substantially as set forth therein with the exception that the angular inclination of the bed plate is decreased from 45° to 35°. The results of this Example are generally comparable to the results obtained in Example I.

EXAMPLE X

The procedures described in Example I are followed substantially as set forth therein with the exception that the angular inclination of the bed plate is decreased from 45° to 20°. The results of this Example are generally comparable to the results obtained in Example I.

EXAMPLE XI

The procedures described in Example I are followed substantially as set forth therein with the exception that a viscosity thickening agent is added to the formulation of the wet, tacky, ungelled plastisol to increase the viscosity to 1300 centipoises (Brookfield, #4 spindle, 20 r.p.m., room temperature). The results of this Example are generally comparable to the results of Example I, except that there is a lower decorative chip or flake consumption in the operation.

EXAMPLE XII

The procedures described in Example I are followed substantially as set forth therein with the exception that the thickness of the layer of wet, tacky, ungelled plastisol is increased from 0.007 inch to 0.009 inch. The results of this Example are generally comparable to the results of Example I, with the exception that the decorative chip or flake consumption is increased.

EXAMPLE XIII

The procedures described in Example I are followed substantially as set forth therein with the exception that the thickness of the layer of wet, tacky, ungelled plastisol is decreased from 0.007 inch to 0.005 inch. The results of this Example are generally comparable to the results obtained in Example I, except that the decorative chip or flake consumption is decreased.

Although several specific working examples of the present inventive concept have been described in particularity, the same should not be construed as limitative of the broader aspects of the present invention but merely illustrative thereof. It is to be understood that various suitable changes, modifications and variations may be made without departing from the scope and the spirit of the appended claims.

What is claimed is:

1. A method for making decorative inlaid types of resilient sheet materials which comprises: forming a layer of ungelled resinous polymer composition having a wet, tacky surface; depositing a substantially uniform layer of decorative chips or flakes upon said wet, tacky surface as it is being advanced angularly forwardly and upwardly at an angle greater than the angle of repose of said decorative chips or flakes on said wet tacky surface; advancing said wet, tacky surface with said decorative chips or flakes thereon angularly forwardly and upwardly at an angle greater than the angle of repose for said decorative chips or flakes upon said wet, tacky surface, whereby a portion of said decorative chips or flakes slide backwardly and downwardly; beating or vibrating said wet, tacky surface, whereby an additional portion of said decorative chips or flakes slide backwardly and downwardly; providing a seal substantially in contact with said wet, tacky surface, capable of permitting said wet, tacky surface to be advanced angularly forwardly and upwardly thereunder but capable of preventing said decorative chips or flakes from slipping backwardly or downwardly thereunder, whereby a supply bank of said decorative chips or flakes is formed on said seal and a portion of said wet, tacky surface; and consolidating said layer of ungelled resinous polymer composition and said decorative chips or flakes which remain on said wet, tacky surface, whereby said decorative chips or flakes become substantially completely embedded in said layer of ungelled resinous polymer composition.

2. A method as defined in claim 1, wherein said layer of ungelled resinous polymer composition is formed above the surface of a gelled resinous polymer composition.

3. A method as defined in claim 2, wherein a barrier coat is positioned over said gelled resinous polymer composition before said layer of ungelled resinous polymer composition is formed thereon.

4. A method as defined in claim 3, wherein said barrier coat has a thickness of from about 1 mil to about 6 mils.

5. A method as defined in claim 1, wherein said consolidating is followed by a heating at a sufficiently elevated temperature as to fuse said resinous polymer composition.

6. A method as defined in claim 2, wherein said gelled resinous polymer composition contains a blowing or foaming agent and said consolidating is followed by a heating at a sufficiently elevated temperature as to decompose or activate said blowing or foaming agent as to cause blowing or foaming of said gelled resinous polymer composition.

7. A method as defined in claim 1, wherein the amount of said decorative chips or flakes deposited on and adhered to said wet, tacky surface depends upon (1) the thickness, (2) the viscosity, (3) the forward and upward angular motion, and (4) the beating or vibrating of said layer of ungelled resinous polymer composition.

8. A method as defined in claim 1, wherein said layer of ungelled resinous polymer composition has a thickness of from about 4 mils to about 20 mils.

9. A method as defined in claim 1, wherein said layer of ungelled resinous polymer composition has a thickness of from about 5 mils to about 9 mils.

10. A method as defined in claim 1, wherein said layer of ungelled resinous polymer composition has a viscosity of from about 500 centipoises to about 50,000 centipoises.

11. A method as defined in claim 1, wherein said layer of ungelled resinous polymer composition has a viscosity of from about 1000 centipoises to about 1300 centipoises.

12. A method as defined in claim 1, wherein said wet, tacky, surface with said decorative chips or flakes thereon is advanced angularly forwardly and upwardly at an angle in the range of from about 30° to about 60° to the horizontal.

13. Apparatus for making decorative inlaid types of resilient sheet materials which comprises: means for forming a layer of ungelled resinous polymer composition having a wet, tacky surface; means for depositing a substantially uniform layer of decorative chips or flakes upon said wet, tacky surface as it is being advanced angularly forwardly and upwardly at an angle greater than the angle of repose of said decorative chips or flakes on said wet, tacky surface; means for advancing said wet, tacky surface with said decorative chips or flakes thereon angularly forwardly and upwardly at an angle greater than the angle of repose for said decorative chips or flakes upon said wet, tacky surface, whereby a portion of said decorative chips or flakes slide backwardly and downwardly; means for beating or vibrating said wet, tacky surface, whereby an additional portion of said decorative chips or flakes slide backwardly and downwardly; a seal substantially in contact with said wet, tacky surface, capable of permitting said wet, tacky surface to be advanced angularly forwardly and upwardly thereunder but capable of preventing said decorative chips or flakes from slipping backwardly and downwardly thereunder, whereby a supply bank of said decorative chips or flakes is formed on said seal and a portion of said wet, tacky surface; and means for consolidating said layer of ungelled resinous polymer composition and said decorative chips or flakes which remain on said wet, tacky surface, whereby said decorative chips or flakes become substantially completely embedded in said layer of ungelled resinous polymer composition.

14. Apparatus as defined in claim 13, wherein said means for advancing said wet, tacky surface angularly forwardly and upwardly comprises a bed plate positioned at an angle of from about 30° to about 60° to the horizontal.

15. Apparatus as defined in claim 13, wherein said seal for depositing a substantially uniform layer of decorative chips or flakes upon said wet, tacky surface comprises a flexible seal blade member, the end of which rests lightly on the surface of said wet, tacky surface without creating any permanent deformation or any disturbance to said wet, tacky surface.

16. Apparatus as defined in claim 13, wherein said seal for depositing a substantially uniform layer of decorative chips or flakes upon said wet, tacky surface comprises a flexible seal blade member, the end of which is spaced from the wet, tacky surface by a distance of from about 0.001 inch to about 0.125 inch.

17. Apparatus as defined in claim 13, wherein heating means is provided to heat said resinous polymer composition to an elevated temperature after said consolidating.

18. Apparatus as defined in claim 13, wherein means is provided to form a layer of gelled resinous polymer composition, upon which said layer of ungelled resinous polymer composition may be formed.

19. A method as defined in claim 1, wherein said seal is flexible and rests lightly on said advancing wet, tacky surface without creating any permanent deformation therein or any disturbance thereof.

20. A method as defined in claim 1, wherein said seal is flexible and has an end which is spaced from the surface of said wet, tacky surface by a distance capable of preventing said decorative chips or flakes from slipping backwardly and downwardly thereunder.

21. A method as defined in claim 1, wherein said decorative chips or flakes are deposited on said wet, tacky surface at a point angularly forwardly and upwardly of said seal.

22. Apparatus as defined in claim 13, wherein said seal forms a floor for said supply bank of decorative chips or flakes.

* * * * *